United States Patent
Park et al.

(10) Patent No.: US 11,709,752 B2
(45) Date of Patent: Jul. 25, 2023

(54) PAUSE AND RESUME IN DATABASE SYSTEM WORKLOAD CAPTURE AND REPLAY

(71) Applicant: SAP SE, Walldorf (DE)

(72) Inventors: Myunggon Park, Seoul (KR); Wonyoung Kwak, Seoul (KR); YoungSeok Hwang, Seoul (KR); Jihun Kang, Seoul (KR)

(73) Assignee: SAP SE, Walldorf (DE)

( * ) Notice: Subject to any disclaimer, the term of this patent is extended or adjusted under 35 U.S.C. 154(b) by 267 days.

(21) Appl. No.: 16/838,113

(22) Filed: Apr. 2, 2020

(65) Prior Publication Data

US 2021/0311850 A1    Oct. 7, 2021

(51) Int. Cl.
*G06F 11/34* (2006.01)
*G06F 11/30* (2006.01)
*G06F 16/14* (2019.01)
*G06F 16/182* (2019.01)

(52) U.S. Cl.
CPC ...... *G06F 11/3414* (2013.01); *G06F 11/3034* (2013.01); *G06F 11/3466* (2013.01); *G06F 16/144* (2019.01); *G06F 16/156* (2019.01); *G06F 16/182* (2019.01); *G06F 2201/80* (2013.01)

(58) Field of Classification Search
CPC ............. G06F 11/3414; G06F 11/3404; G06F 11/3466; G06F 16/144; G06F 16/182; G06F 16/156; G06F 2201/80
USPC ........................................................ 717/124
See application file for complete search history.

(56) References Cited

U.S. PATENT DOCUMENTS

| | | | |
|---|---|---|---|
| 6,086,617 A | 7/2000 | Waldon et al. | |
| 7,096,455 B2* | 8/2006 | Santiago | G06F 16/986 707/E17.118 |
| 7,168,065 B1 | 1/2007 | Naccache et al. | |
| 7,305,421 B2 | 12/2007 | Cha et al. | |
| 7,930,274 B2 | 4/2011 | Hwang et al. | |

(Continued)

OTHER PUBLICATIONS

Berkeley.edu [online], "Concurrency Control: Locking, Optimistic, Degrees of Consistency," retrieved from https://people.eecs.berkeley.edu/-brewer/cs262/cc.pdf, on or before May 2008, 6 pages.

(Continued)

*Primary Examiner* — Chat C Do
*Assistant Examiner* — Bradford F Wheaton
(74) *Attorney, Agent, or Firm* — Fish & Richardson P.C.

(57) ABSTRACT

Methods, systems, and computer-readable storage media for receiving a capture file, the capture file holding data representative of a workload executed in a source database system, processing the capture file to provide a replay file, the replay file being in a format that is executable by a replayer to replay the workload in a target database system, the workload including a set of requests represented within the replay file, providing a set of tags associated with the replay file, the set of tags including one or more tags, each tag associated with a request in the set of requests, and during replay of the workload in the target database system: pausing replay of the workload in response to a tag, executing a request associated with the tag, providing replay results specific to the request, and selectively resuming replay of the workload in the target database system.

20 Claims, 9 Drawing Sheets

(56) References Cited

U.S. PATENT DOCUMENTS

| | | | |
|---|---|---|---|
| 8,024,299 B2 * | 9/2011 | Dias | G06F 16/20 |
| | | | 707/804 |
| 8,046,334 B2 | 10/2011 | Hwang et al. | |
| 8,069,439 B2 * | 11/2011 | Shukla | G06Q 10/06316 |
| | | | 717/125 |
| 8,442,962 B2 | 5/2013 | Lee et al. | |
| 8,504,691 B1 | 8/2013 | Tobler | |
| 8,700,660 B2 | 4/2014 | Lee et al. | |
| 8,768,927 B2 | 7/2014 | Yoon et al. | |
| 8,782,100 B2 | 7/2014 | Yoon et al. | |
| 8,793,276 B2 | 7/2014 | Lee et al. | |
| 8,918,436 B2 | 12/2014 | Yoon et al. | |
| 8,935,205 B2 | 1/2015 | Hildenbrand et al. | |
| 9,009,182 B2 | 4/2015 | Renkes et al. | |
| 9,037,677 B2 | 5/2015 | Lee et al. | |
| 9,063,969 B2 | 6/2015 | Lee et al. | |
| 9,098,522 B2 | 8/2015 | Lee et al. | |
| 9,119,056 B2 | 8/2015 | Hourani et al. | |
| 9,165,010 B2 | 10/2015 | Faerber et al. | |
| 9,171,020 B2 | 10/2015 | Faerber et al. | |
| 9,336,262 B2 | 5/2016 | Lee et al. | |
| 9,336,284 B2 | 5/2016 | Lee et al. | |
| 9,361,340 B2 | 6/2016 | Jeong et al. | |
| 9,465,829 B2 | 10/2016 | Faerber et al. | |
| 9,465,843 B2 | 10/2016 | Yoon et al. | |
| 9,465,844 B2 | 10/2016 | Faerber et al. | |
| 9,483,516 B2 | 11/2016 | Lee et al. | |
| 9,501,502 B2 | 11/2016 | Lee et al. | |
| 9,558,229 B2 | 1/2017 | Lee et al. | |
| 9,558,258 B2 | 1/2017 | Yoon et al. | |
| 9,594,799 B2 | 3/2017 | Faerber et al. | |
| 9,619,514 B2 | 4/2017 | Mindnich et al. | |
| 9,635,093 B2 | 4/2017 | Lee et al. | |
| 9,720,949 B2 | 8/2017 | Lee et al. | |
| 9,720,992 B2 | 8/2017 | Lee et al. | |
| 9,740,715 B2 | 8/2017 | Faerber et al. | |
| 9,792,318 B2 | 10/2017 | Schreter et al. | |
| 9,798,759 B2 | 10/2017 | Schreter et al. | |
| 9,805,074 B2 | 10/2017 | Lee et al. | |
| 9,824,134 B2 | 11/2017 | Schreter et al. | |
| 9,846,724 B2 | 12/2017 | Weyerhaeuser et al. | |
| 9,892,163 B2 | 2/2018 | Kim et al. | |
| 2002/0015829 A1 | 2/2002 | Kim | |
| 2002/0191797 A1 | 12/2002 | Perlman | |
| 2003/0061537 A1 | 3/2003 | Cha et al. | |
| 2005/0099960 A1 | 5/2005 | Boss et al. | |
| 2005/0262512 A1 | 11/2005 | Schmidt et al. | |
| 2008/0033914 A1 | 2/2008 | Cherniack et al. | |
| 2008/0065670 A1 | 3/2008 | Cha et al. | |
| 2008/0091806 A1 | 4/2008 | Shen et al. | |
| 2008/0097960 A1 | 4/2008 | Dias et al. | |
| 2009/0070330 A1 | 3/2009 | Hwang et al. | |
| 2009/0254774 A1 | 10/2009 | Chamdani et al. | |
| 2010/0205323 A1 | 8/2010 | Bareness et al. | |
| 2010/0257513 A1 * | 10/2010 | Thirumalai | G06F 16/2365 |
| | | | 717/134 |
| 2011/0161300 A1 | 6/2011 | Hwang et al. | |
| 2011/0276550 A1 | 11/2011 | Colle et al. | |
| 2012/0084273 A1 | 4/2012 | Lee et al. | |
| 2012/0084274 A1 | 4/2012 | Renkes et al. | |
| 2012/0150913 A1 | 6/2012 | De Smet et al. | |
| 2012/0166407 A1 | 6/2012 | Lee et al. | |
| 2012/0167098 A1 | 6/2012 | Lee et al. | |
| 2012/0173515 A1 | 7/2012 | Jeong et al. | |
| 2012/0204153 A1 * | 8/2012 | Peterson | G06F 11/3672 |
| | | | 717/124 |
| 2012/0216244 A1 | 8/2012 | Kumar | |
| 2012/0221513 A1 | 8/2012 | Papadomanolakis et al. | |
| 2012/0221519 A1 | 8/2012 | Papadomanolakis et al. | |
| 2013/0042003 A1 | 2/2013 | Franco et al. | |
| 2013/0124475 A1 | 5/2013 | Hildenbrand et al. | |
| 2013/0144866 A1 | 6/2013 | Jerzak | |
| 2013/0166534 A1 | 6/2013 | Yoon et al. | |
| 2013/0166553 A1 | 6/2013 | Yoon et al. | |
| 2013/0166554 A1 | 6/2013 | Yoon et al. | |
| 2013/0275457 A1 | 10/2013 | Lee et al. | |
| 2013/0275467 A1 | 10/2013 | Lee et al. | |
| 2013/0275468 A1 | 10/2013 | Lee et al. | |
| 2013/0275550 A1 | 10/2013 | Lee et al. | |
| 2013/0290282 A1 | 10/2013 | Faerber et al. | |
| 2013/0304714 A1 | 11/2013 | Lee et al. | |
| 2014/0122439 A1 | 5/2014 | Faerber et al. | |
| 2014/0122452 A1 | 5/2014 | Faerber et al. | |
| 2014/0136473 A1 | 5/2014 | Faerber et al. | |
| 2014/0136788 A1 | 5/2014 | Faerber et al. | |
| 2014/0149353 A1 | 5/2014 | Lee et al. | |
| 2014/0149368 A1 | 5/2014 | Lee et al. | |
| 2014/0149527 A1 | 5/2014 | Lee et al. | |
| 2014/0156619 A1 | 6/2014 | Lee et al. | |
| 2014/0222418 A1 | 8/2014 | Richtarsky et al. | |
| 2014/0244628 A1 | 8/2014 | Yoon et al. | |
| 2014/0297686 A1 | 10/2014 | Lee et al. | |
| 2014/0304219 A1 | 10/2014 | Yoon et al. | |
| 2015/0026154 A1 | 1/2015 | Jeong et al. | |
| 2015/0074082 A1 | 3/2015 | Yoon et al. | |
| 2015/0149409 A1 | 5/2015 | Lee et al. | |
| 2015/0149413 A1 | 5/2015 | Lee et al. | |
| 2015/0149426 A1 | 5/2015 | Kim et al. | |
| 2015/0149442 A1 | 5/2015 | Kim et al. | |
| 2015/0149704 A1 | 5/2015 | Lee et al. | |
| 2015/0149736 A1 | 5/2015 | Kwon et al. | |
| 2015/0178343 A1 | 6/2015 | Renkes et al. | |
| 2015/0242400 A1 | 8/2015 | Bensberg et al. | |
| 2015/0242451 A1 | 8/2015 | Bensberg et al. | |
| 2015/0261805 A1 | 9/2015 | Lee et al. | |
| 2015/0347410 A1 | 12/2015 | Kim et al. | |
| 2015/0363463 A1 | 12/2015 | Mindnich et al. | |
| 2016/0004786 A1 | 1/2016 | Bosman et al. | |
| 2016/0042016 A1 | 2/2016 | Faerber et al. | |
| 2016/0042028 A1 | 2/2016 | Faerber et al. | |
| 2016/0065498 A1 * | 3/2016 | Harper | H04L 1/188 |
| | | | 709/223 |
| 2016/0140175 A1 | 5/2016 | Weyerhaeuser et al. | |
| 2016/0147617 A1 | 5/2016 | Lee et al. | |
| 2016/0147618 A1 | 5/2016 | Lee et al. | |
| 2016/0147813 A1 | 5/2016 | Lee et al. | |
| 2016/0147814 A1 | 5/2016 | Goel et al. | |
| 2016/0147821 A1 | 5/2016 | Schreter et al. | |
| 2016/0147834 A1 | 5/2016 | Lee et al. | |
| 2016/0147858 A1 | 5/2016 | Lee et al. | |
| 2016/0147859 A1 | 5/2016 | Lee et al. | |
| 2016/0147861 A1 | 5/2016 | Schreter | |
| 2016/0147862 A1 | 5/2016 | Schreter | |
| 2016/0147906 A1 | 5/2016 | Schreter | |
| 2016/0266906 A1 * | 9/2016 | Zou | G06F 9/3836 |
| 2016/0292227 A1 | 10/2016 | Jeong et al. | |
| 2016/0364440 A1 | 12/2016 | Lee et al. | |
| 2016/0371319 A1 | 12/2016 | Park et al. | |
| 2016/0371356 A1 | 12/2016 | Lee et al. | |
| 2016/0371357 A1 | 12/2016 | Park et al. | |
| 2016/0371358 A1 | 12/2016 | Lee et al. | |
| 2016/0378813 A1 | 12/2016 | Yoon et al. | |
| 2016/0378826 A1 | 12/2016 | Bensberg et al. | |
| 2017/0004158 A1 | 1/2017 | Faerber et al. | |
| 2017/0004177 A1 | 1/2017 | Faerber et al. | |
| 2017/0068608 A1 | 3/2017 | Covell et al. | |
| 2017/0083538 A1 | 3/2017 | Tonder et al. | |
| 2017/0097977 A1 | 4/2017 | Yoon et al. | |
| 2017/0123877 A1 | 5/2017 | Gongloor et al. | |
| 2017/0147628 A1 | 5/2017 | Park et al. | |
| 2017/0147638 A1 | 5/2017 | Park et al. | |
| 2017/0147639 A1 | 5/2017 | Lee et al. | |
| 2017/0147644 A1 | 5/2017 | Lee et al. | |
| 2017/0147645 A1 | 5/2017 | Song et al. | |
| 2017/0147646 A1 | 5/2017 | Lee et al. | |
| 2017/0147671 A1 | 5/2017 | Bensberg et al. | |
| 2017/0177658 A1 | 5/2017 | Lee et al. | |
| 2017/0177697 A1 | 6/2017 | Lee et al. | |
| 2017/0177698 A1 | 6/2017 | Lee et al. | |
| 2017/0185642 A1 | 6/2017 | Faerber et al. | |
| 2017/0322972 A1 | 11/2017 | Lee et al. | |
| 2017/0329835 A1 | 11/2017 | Lee et al. | |
| 2017/0351718 A1 | 12/2017 | Faerber et al. | |
| 2017/0357575 A1 | 12/2017 | Lee et al. | |

(56) References Cited

U.S. PATENT DOCUMENTS

| | | |
|---|---|---|
| 2017/0357576 A1 | 12/2017 | Lee et al. |
| 2017/0357577 A1 | 12/2017 | Lee et al. |
| 2018/0013692 A1 | 1/2018 | Park et al. |
| 2018/0074919 A1 | 3/2018 | Lee et al. |
| 2018/0075083 A1 | 3/2018 | Lee et al. |
| 2019/0222658 A1 | 7/2019 | Park et al. |
| 2019/0324892 A1* | 10/2019 | Gabryjelski ........ G06F 11/3636 |

OTHER PUBLICATIONS

Binnig et al., "Distributed Snapshot Isolation: Global Transactions Pay Globally, Local Transactions Pay Locally", VLDB J. 23(6): 987-1011 (2014), 25 pages.
Cha et al., "An Extensible Architecture for Main-Memory RealTime Storage Systems", RTCSA : 67-73 (1996), 7 pages.
Cha et al., "An Object-Oriented Model for FMS Control", Intelligent Manufacturing 7(5): 387-391 (1996), 5 pages.
Cha et al., "Cache-Conscious Concurrency Control of MainMemory Indexes on Shared-Memory Multiprocessor Systems", VLDB: 181-190 (2001), 10 pages.
Cha et al., "Efficient Web-Based Access to Multiple Geographic Databases Through Automatically Generated Wrappers", WISE : 34-41 (2000), 8 pages.
Cha et al., "Interval Disaggregate: a New Operator for Business Planning", PVLDB 7(13): 1381-1392 (2014), 12 pages.
Cha et al., "Kaleidoscope Data Model for an English-like Query Language", VLDB: 351-361 (1991), 11 pages.
Cha et al., "Kaleidoscope: a Cooperative Menu-Guided Query Interface", SIGMOD Conference : 387 (1990), 1 page.
Cha et al., "MEADOW: a Middleware for Efficient Access to Multiple Geographic Databases Through OpenGIS Wrappers", Software Pract. Exper. 32(4): 377-402 (2002), 26 pages.
Cha et al., "Object-Oriented Design of Main-Memory DBMS for Real-Time Applications", RTCSA : 109-115 (1995), 7 pages.
Cha et al., "P*TIME: Highly Scalable OLTP DBMS for Managing Update-Intensive Stream Workload", VLDB: 1033-1044 (2004), 12 pages.
Cha et al., "Paradigm Shift to New DBMS Architectures: Research Issues and Market Needs", ICDE: 1140 (2005), 1 page.
Cha et al., "Xmas: an Extensible Main-Memory Storage System", CIKM: 356-362 (1997), 7 pages.
Colle et al., "Oracle Database Replay," retrieved from http://www.vldb.org/pvldb/2/vldb09-588.pdf, on or before Sep. 2017, 4 pages.
Dasari, "Modify Parameters to Optimize HANA universe," retrieved from https://blogs.sap.com/2014/05/03/modifyparameters-to-optimize-hana-universe/, on Dec. 22, 2020, 2 pages.
DCX.com [online], "Relay Server logging and SAP Passports," retrieved from http://dcx.sap.com/sqla170/en/html/81f2d96b6ce21014a2779d4e67801fc2.html, on Dec. 22, 2020, 1 page.
Farber et al., "SAP HANA Database—Data Management for Modern Business Applications." SIGMOD Record 40(4): 45-51 (2011), 8 pages.
Hwang et al., "Performance Evaluation of Main-Memory R-tree Variants", SSTD: 10-27 (2003), 18 pages.
Kim et al., "Optimizing Multidimensional Index Trees for Main Memory Access", SIGMOD Conference: 139-150 (2001), 12 pages.

Lee et al., "A Performance Anomaly Detection and Analysis Framework for DBMS Development", IEEE Trans. Knowl. Data Eng. 24(8): 1345-1360 (2012), 16 pages.
Lee et al., "Differential Logging: a Commutative and Associative Logging Scheme for Highly Parallel Main Memory Databases", ICDE 173-182 (2001), 10 pages.
Lee et al., "High-Performance Transaction Processing in SAP HANA", IEEE Eng. Bull. Data. 36(2): 28-33 (2013), 6 pages.
Lee et al., "SAP HANA Distributed In-Memory Database System: Transaction, Session, and Metadata Management", ICDE 1165-1173 (2013), 9 pages.
Oracle.com [online], "Database SQL Language Reference. Types of SQL Statements," retrieved from https://docs.oracle.com/cd/B19306_01/server.102/b14200/statements_1001.htm, on or before Dec. 22, 2020, 4 pages.
Oracle.com [online], "Oracle Database 11g: the Top New Features for DBAs and Developers-Database Replay," retrieved from http://www.oracle.com/technetwork/articles/sql/1 1g-replay-099279.html on Dec. 22, 2020, 22 pages.
Park et al., "Xmas: an Extensible Main-Memory Storage System for High-Performance Applications". SIGMOD Conference : 578-580 (1998), 3 pages.
SAP Cloud Computing, "Have no Fear, Cloud is here" Recap from 2 TechEd's and a Preview on Bangalore retrieved from http://computing1501.rssing.com/chan-8466524/all_p7.html, on Dec. 22, 2020, 59 pages.
SAP.com [online], "Explain Plan," retrieved from https://help.sap.com/viewer/4fe29514fd584807ac9f2a04f6754767/2.0.00/en-US/20d9ec5575191014a251e58ecf90997a.html, on or before Dec. 22, 2020, 5 pages.
SAP.com [online], "Performance Trace Options," retrieved from https://help.sap.com/doc/bed8c14f9f024763b0777aa72b5436f6/2.0.00/en-US/80dcc904a81547a69a7e7105f77e0e91.html, on Dec. 22, 2020, 1 page.
SAP.com [online], "SAP Controls Technology Part 3," retrieved from http://www.itpsap.com/blog/2012/06/23/sap-controls-technology-part-3/, on Dec. 22, 2020, 4 pages.
SAP.com [online], "SQL Statements in SAP HANA," retrieved from http://sapstudent.com/hana/sql-statements-in-sap-hana, on Aug. 16, 2017, 4 pages.
SAP.com [online], "Stop and Start a Database Service," retrieved from https://help.sap.com/doc/6694445c94ae495c83al9646e7c3fd56/2.0.00/en-US/C13db243bb571014bd35a3f2f6718916.html, on Dec. 22, 2020, 2 pages.
Scribd.com [online], "Week 5 Unit 1: Server-Side JavaScript (XSJS)" retrieved from https://www.scribd.com/document/277530934/Week-05-Exposingand-Consmning-Data-With-Server-Side-JavaScript-Presentation, on Dec. 22, 2020, 29 pages.
Sikka et al., "Efficient Transaction Processing in SAP HANA Database: the End of a Column Store Myth", SIGMOD Conference: 731-742 (2012), 11 pages.
SlideShare.net [online], "SAP HANA SPS 09- What's New?," retrieved from https://www.slideshare.net/SAPTechnology/sap-hana-sps-09-smart-data-streaming, Nov. 2014, 48 pages.
Yoo et al., "A Middleware Implementation of Active Rules for ODBMS", DASFAA: 347-354 (1999), 8 pages.
Yoo et al., "Integrity Maintenance in a Heterogeneous Engineering Database Environment", Data Know!. Eng. 21(3): 347-363 (1997), 17 pages.

* cited by examiner

```
selqnta4:/usr/sap/MG1/HDB81/selqnta4/trace/cpt> tar -zxvf
perfanalyzer_3706196093635243.cpt
MANIFEST
SQL_TYPE_INFO
perfanalyzer_indexserver_selqnta4.38103.3706196093635243.sql.00000.msr.gz
perfanalyzer_indexserver_selqnta4.38103.3706196093635243.resource.00000.msr.gz
perfanalyzer_indexserver_selqnta4.38103.3706196093635243.hsh.00000.apx.gz
perfanalyzer_indexserver_selqnta4.38103.3706196093635243.prm.00000.apx.gz
perfanalyzer_indexserver_selqnta4.38103.3706196093635243.rst.00000.apx.gz
perfanalyzer_indexserver_selqnta4.38103.3706196093635243.pln.00000.apx.gz
perfanalyzer_indexserver_selqnta4.38103.3706196093635243.transaction.00000.apx.gz
perfanalyzer_indexserver_selqnta4.38103.3706196093635243.application.00000.ctx.gz
perfanalyzer_indexserver_selqnta4.38103.3706196093635243.session.0000.ctx.gz
```

*FIG. 5A*

```
selqnta4:/usr/sap/MGA/HDB91/selqnta4/trace/MGA_38910726030608538> tree
.
|-- 31
|   |-- 313526
|   |   |-- parameters.dat
|   |   |-- requests.dat
|   |   '-- session.ctl
|   '-- 313527
|       |-- parameters.dat
|       |-- requests.dat
|       '-- session.ctl
|-- batch_update_counts.dat
|-- nested_statements.dat
|-- nondeterministic_functions.dat
|-- results.dat
|-- sql_types.dat
```

*FIG. 5B*

PAUSE AND RESUME IN DATABASE SYSTEM WORKLOAD CAPTURE AND REPLAY

BACKGROUND

Enterprises leverage database systems to store and access data, and, often, significant amounts of data. Some database systems store thousands to millions of records that are frequently accessed. For example, transactions can be repeatedly executed to access and/or manipulate data stored within a database system. In some examples, transactions include queries that are issued to the database system by clients (e.g., users, applications). Queries can be received as query statements written in a query language (e.g., structured query language (SQL)).

There is a drive to optimize performance of database systems. Optimization can improve execution time of transactions, as well as reduce the load on technical resources (e.g., processors, memory) during execution of transactions. In some instances, optimization can be achieved by changing operational parameters of the database system, and/or changing versions of software implementing the database system. However, in some cases, such changes can have a negative impact on the performance.

In view of this, prior to changing database system parameters and/or software, it can be useful to evaluate the performance of a target database system that implements the changes to compare its performance with a source database system (e.g., a database system that does not include the changes). In some instances, a simulated or emulated workload is run on the target database system. However, the simulated or emulated workload may not accurately reflect the workload experienced by the source database system. Accordingly, results from the target database system may not accurately reflect the performance of the production database system under the changes.

SUMMARY

Implementations of the present disclosure are directed to pause and resume functionality in capture and replay of workloads in database systems. More particularly, implementations of the present disclosure are directed to tagging one or more requests in a workload of a source database system that is replayed in a target database system, the tags enabling request-specific replay to provide granular results.

In some implementations, actions include receiving a capture file, the capture file holding data representative of a workload executed in a source database system, processing the capture file to provide a replay file, the replay file being in a format that is executable by a replayer to replay the workload in a target database system, the workload including a set of requests represented within the replay file, providing a set of tags associated with the replay file, the set of tags including one or more tags, each tag associated with a request in the set of requests, and during replay of the workload in the target database system: pausing replay of the workload in response to a tag, executing a request associated with the tag, providing replay results specific to the request, and selectively resuming replay of the workload in the target database system. Other implementations of this aspect include corresponding systems, apparatus, and computer programs, configured to perform the actions of the methods, encoded on computer storage devices.

These and other implementations can each optionally include one or more of the following features: the tag includes a pause tag and resuming replay of the workload is performed in response to user input; the tag includes an exclusive tag and resuming replay of the workload is automatically performed absent user input; the replay results include one or more of results data and performance data as indicated in the tag; executing the request associated with the tag is performed in response to user input; prior to replay of the workload, the target database system is initialized to a state of the source database system when the workload was captured at the source database system; and the request includes at least one query statement that is executed in the target database system to manipulate data within the target database system.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

FIG. 5A depicts an example structure of a capture file.

FIG. 5B depicts an example structure of a replay file that is provided by a pre-processor processing the capture file of FIG. 5A.

DETAILED DESCRIPTION

Implementations of the present disclosure are directed to pause and resume functionality in capture and replay of workloads in database systems. More particularly, implementations of the present disclosure are directed to tagging one or more requests in a workload of a source database system that is replayed in a target database system, the tags enabling request-specific replay to provide granular results. Implementations can include actions of receiving a capture file, the capture file holding data representative of a workload executed in a source database system, processing the capture file to provide a replay file, the replay file being in a format that is executable by a replayer to replay the workload in a target database system, the workload including a set of requests represented within the replay file, providing a set of tags associated with the replay file, the set of tags including one or more tags, each tag associated with a request in the set of requests, and during replay of the workload in the target database system: pausing replay of the workload in response to a tag, executing a request associated with the tag, providing replay results specific to the request, and selectively resuming replay of the workload in the target database system.

Implementations of the present disclosure are described in further detail with reference to an example database system. The example database system is provided as the SAP HANA in-memory database system provided by SAP SE of Walldorf, Germany. SAP HANA can be described as a data platform that processes transactions and analytics at the same time on any data type, with built-in advanced analytics and multi-model data processing engines. More particularly, SAP HANA is an in-memory database system. In some examples, an in-memory database system can be described as a database system that uses main memory for data storage. In some examples, main memory includes random access memory (RAM) that communicates with one or more processors (e.g., central processing units (CPUs)), over a memory bus. An-memory database can be contrasted with database management systems that employ a disk storage mechanism. In some examples, in-memory databases are faster than disk storage databases, because internal optimization algorithms can be simpler and execute fewer CPU instructions (e.g., require reduced CPU consumption). In some examples, accessing data in an in-memory database eliminates seek time when querying the data, which provides faster and more predictable performance than disk-storage databases. While SAP HANA is used as an example herein, it is contemplated, however, that implementations of the present disclosure can be realized in any appropriate database system.

Figure 1:
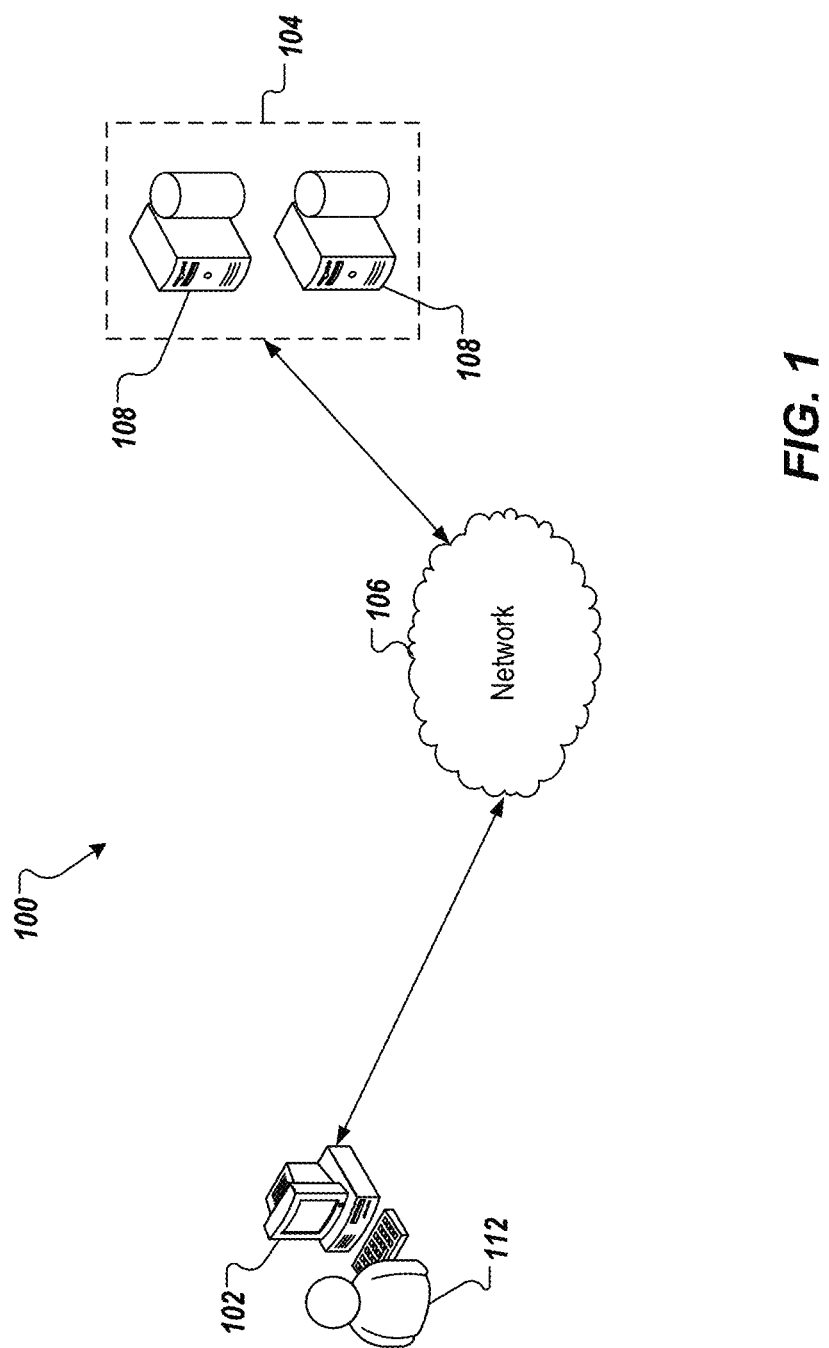
FIG. 1 depicts an example architecture that can be used to execute implementations of the present disclosure.

FIG. 1 depicts an example architecture 100 in accordance with implementations of the present disclosure. In the depicted example, the example architecture 100 includes a client device 102, a network 106, and a server system 104. The server system 104 includes one or more server devices and databases 108 (e.g., processors, memory). In the depicted example, a user 112 interacts with the client device 102.

In some examples, the client device 102 can communicate with the server system 104 over the network 106. In some examples, the client device 102 includes any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices. In some implementations, the network 106 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In some implementations, the server system 104 includes at least one server and at least one data store. In the example of FIG. 1, the server system 104 is intended to represent various forms of servers including, but not limited to a web server, an application server, a proxy server, a network server, and/or a server pool. In general, server systems accept requests for application services and provides such services to any number of client devices (e.g., the client device 102 over the network 106).

In accordance with implementations of the present disclosure, and as noted above, the server system 104 can host an in-memory database system (e.g., SAP HANA). In addition, and as described in further detail herein, the server system 104 can host a source database system, a target database system, and a workload capture and replay system that enables a workload of the source database system to be recorded (captured) and replayed in the target database system. The capture and replay system provides pause and resume functionality for request-specific replay to provide granular results in accordance with implementations of the present disclosure. In some examples, a workload includes a set of requests (e.g., $R_1, \ldots R_m$, where m is a number of requests R in the set of requests). In some examples, a workload operates on a database system to induce changes in the database system through query statements (e.g., structured query language (SQL) statements) that come from client interfaces (e.g., Java Database Connectivity (JDBC), Open Database Connectivity (ODBC), database shared library (DBSL)). A workload can be created by applications or clients.

In some examples, a request is a smaller unit than a query statement (e.g., SQL statement). For example, a query statement can include (or result in) a set of requests (one or more requests). Example requests can include, without limitation, Connect, Disconnect, Prepare Statement, ExecuteStatement, Fetch, AbortTransaction, CommitTransaction, Get LOB Piece, Put LOB Piece, and the like.

To provide further context for implementations of the present disclosure, and as introduced above, there is a drive to optimize performance of database systems. Optimization can improve execution time of transactions, as well as reduce the load on technical resources (e.g., processors, memory) during execution of transactions. In some instances, optimization can be achieved by changing operational parameters of the database system, and/or changing versions of software implementing the database system. However, in some cases, such changes can have a negative impact on the performance.

In view of this, prior to changing database system parameters and/or software, it can be useful to evaluate the performance of a target database system (e.g., a test database system) that implements the changes to compare its performance with a source database system (e.g., a production database system) that does not include the changes. In some instances, a simulated or emulated workload is run on the target database system. However, the simulated or emulated workload may not accurately reflect the workload experienced by the source database system. Accordingly, results from the target database system may not accurately reflect the performance of the source database system under the changes.

To address this issue, capture and replay systems have been developed that enables capturing (recording) of production workloads (actual, real-world workloads) at a source database system, replaying a captured workload at a target database system, and comparing the performance of target database system to the performance of the source database system. An example includes the SAP HANA Capture and Replay tool provided by SAP SE. Although the SAP HANA Capture and Replay tool is referenced herein by way of example, it is contemplated that implementations of the present disclosure can be realized with any appropriate capture and replay system.

In general, the capture and replay system is a fully- or semi-automated tool for integrated testing in the context of a database system (e.g., SAP HANA). The capture and replay system reduces effort needed for creating tests and performs a more accurate replay than is possible with other approaches. In some examples, the capture and replay system enables similar concurrency, memory allocation and CPU usage in the target database system as seen in the source database system, from which the captured workload is provided.

Figure 2:
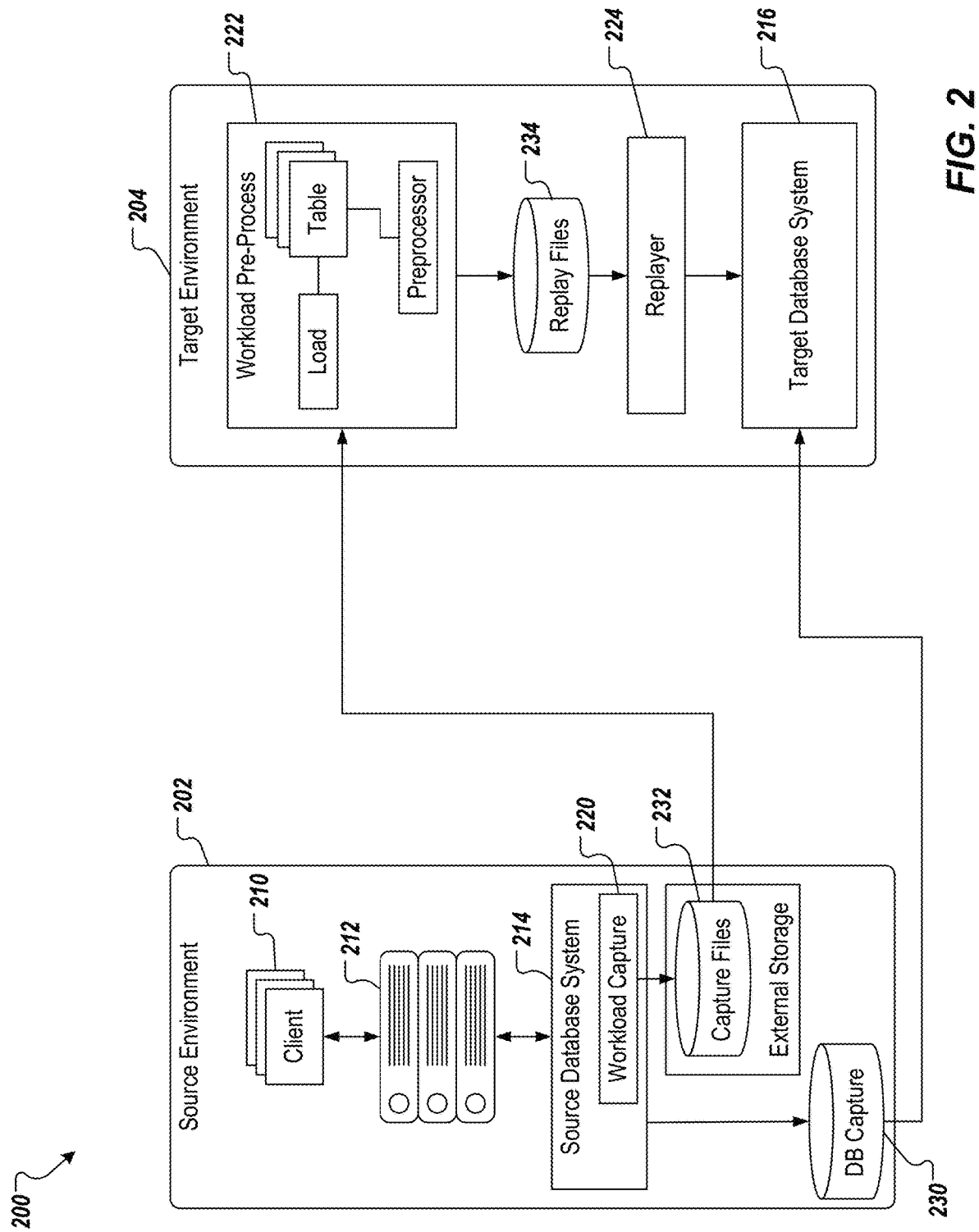
FIG. 2 depicts a conceptual architecture providing capture and replay functionality.

FIG. 2 depicts a conceptual architecture 200 providing capture and replay functionality. In the example of FIG. 2, the conceptual architecture 200 includes a source environment 202 and a target environment 204. The source environment 202 includes one or more clients 210, one or more application servers 212, and a source database system 214. The target environment 204 includes a target database system 216.

In some examples, during production use, the clients 210 interact with the source database system 214 through the application servers 212. For example, a client 210 can instigate a transaction that is to be executed on the source database system 214, which transaction can access, add, modify, and/or delete data within the source database system 214. It can be determined that a configuration and/or software of the target database system 214 are to be changed. Example changes can include changing configuration settings and/or updating the software of the target database system 214 from a first version (V1) to a second version (V2). Prior to implementing the changes in production, the changes are evaluated within the target environment 204.

To evaluate the change, a capture and replay system is used to capture a workload (e.g., one or more transactions) executed within the source environment 202 to replay in the target environment 204. In the example of FIG. 2, the capture and replay system includes a workload capture module 220, a workload pre-processing module 222, and a replay module 224 (also referred to herein as a replayer). In the example of FIG. 2, the workload capture module 220 is executed directly within the source database system 214, and the replay module 224 is executed directly within the target database system 216.

In some examples, prior to executing the workload that is to be captured, at least a portion of the data stored within the source database system 214 is copied to a database capture store 230. For example, data (e.g., stored in one or more tables) that is to be accessed by the workload is stored in the database capture store. In some examples, configuration parameters of the source database system are stored in the database capture store 230. In some examples, the data and configuration parameters recorded in the database capture store 230 provide a snapshot of a state of the source database system 214 immediately prior to execution of the workload. Prior to replay of the workload in the target system 204, the information from the database capture store 230 can be provided to the target system 204. In this manner, the target database system 216 can be initialized to the state of the source database system 214 before manipulation through replay of the workload in the target database system 216. In some examples, after replay of the workload in the target database system 216, the target database system 216 can be re-initialized to the state of the source database system 214 (e.g., to replay the workload again in the target database system 216).

As introduced above, during production use, the one or more clients 210 issue transactions (also referred to herein as requests for database operations) to the one or more application servers 212. The one or more application servers 212 send the requests for database operations to be carried out by the source database system 214. Further, during production use, the source database system 214 can generate information about the requests, which is recorded in one or more capture files stored within a capture file store 232. In some examples, the capture files are generated by the workload capture module 220 and can include information regarding the request (including the request), data, including metadata, generated during execution of the request, the results of the request, and information about the source system 202 (e.g., the clients 210, the application servers 212, and/or the source database system 214.

In some examples, a capture file, or a set of capture files, includes data associated with, and organized by, a capture unit. The capture unit can be, for example, a session between a client 210 and the source database system 214, which is mediated by an application server 212. The session can include one or more requests for database operations, such as one or more statements in a query processing language. In some examples, a capture file, or a set of capture files, represents another processing unit, such as a statement, or a set of statements over a time period.

In some examples, the capture files are pre-processed by the workload pre-processing module 222 to provide one or more replay files that are stored in a replay file store 234. Each replay file enables a workload, or a portion of a workload, to be replayed within the target database system 216 (e.g., by the replay module 224). In some examples, the replay files include decompressed information captured in the capture files, or otherwise include data of one or more capture file provided in a form that is more easily executed at the target database system 216. In addition to information used for replaying requests for database operations, the capture files can include information that is used to evaluate the performance of the target database system 216. In some examples, the replay module 224 processes the replay files to send requests for database operations to the target database system 216, the requests emulating the requests issued by the clients 210 to the source database system 214.

Figure 3:
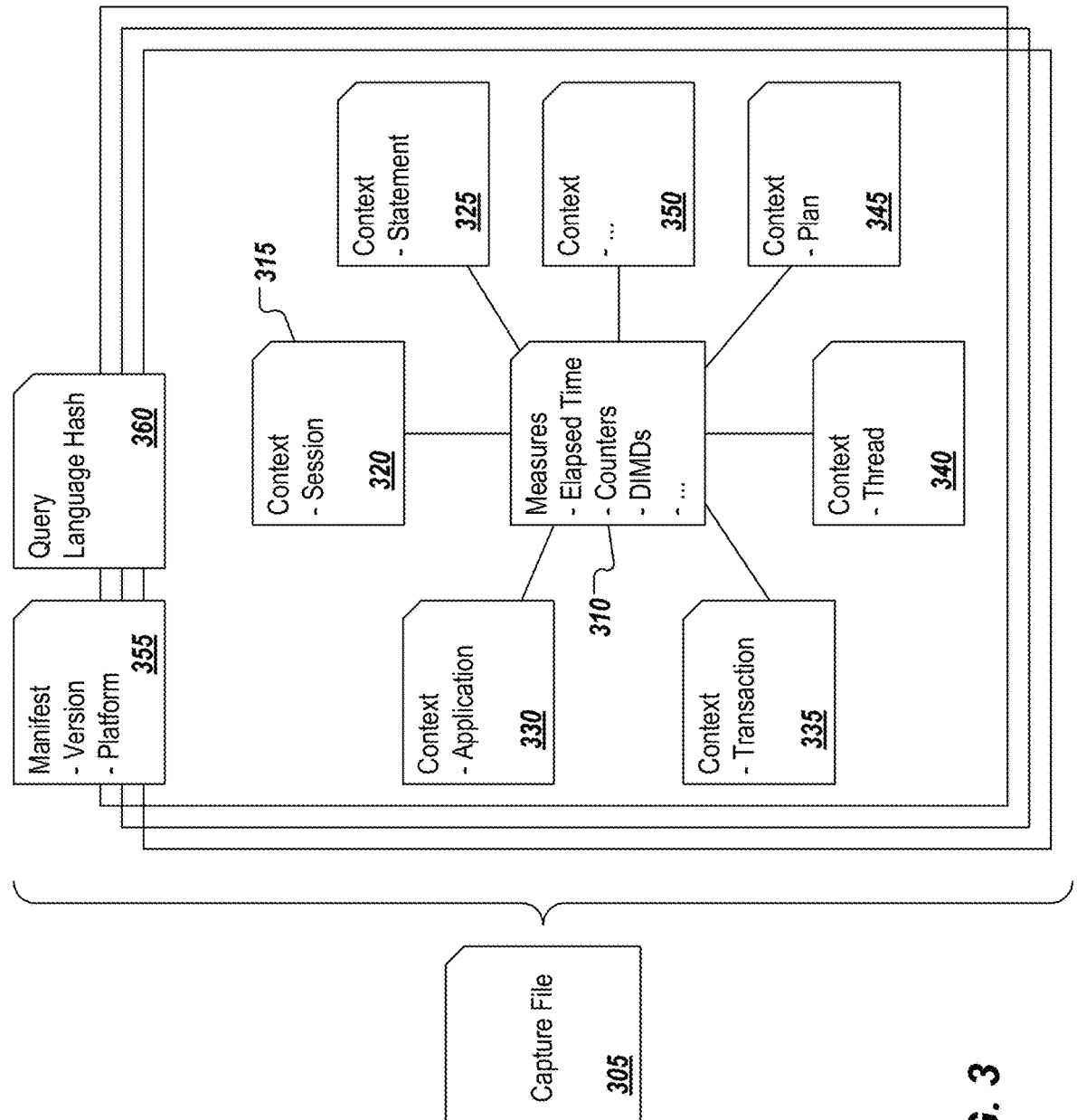
FIG. 3 depicts a workload capture file schema for storing context data and performance data recorded during execution of a workload in a source database system.

FIG. 3 depicts a workload capture file schema 300 for storing context data and performance data recorded during execution of a workload in a source database system (e.g., the source database system 214 of FIG. 2).

In some instances, the volume of information that can be collected for a workload can be large. The volume of information can be reduced by only including a portion of the information, such as a portion of context information, in the capture files. Further, to assist with organization and compression of the information, the information can be organized in a schema or a dimensional model, such as a star schema. For example, measures and facts can be used as a central fact table or tables, which reference as points one or more dimensions, each dimension including one or more contexts. In some examples, each point represents a discrete context, and, in addition to any facts or measures, the fact table includes identifiers for corresponding information in the dimensions.

FIG. 3 depicts a capture file 305 that includes a fact table 310 correlated with a set of dimensions 315. In the example of FIG. 3, the fact table 310 is shown as associated with dimensions 315 representing contexts for a session 320, a statement 325, an application 330, a transaction 335, a thread 340, a plan (such as a query execution plan) 345, and other parameters 350. The fact table 310 includes various measures, such as elapsed time and any counters associated with the capture unit associated with the capture file 305 or collection of capture files (such as a session). The fact table 310 also includes dimension identifiers (DIMIDs) used to correlate entries in the fact table 310 with each of the dimensional contexts 320, 325, 330, 335, 340, 345, 350. Although a single fact table 310 is shown, multiple fact tables 310 can be included in a capture file.

In some examples, the fact table 310 and the dimension tables 315 can include records for a plurality of capture units (e.g., sessions) of the source database system. In some cases, the fact table 310 and each of the dimension tables 315 can be stored as separate files. In some examples, the capture file 305 can be compressed using any appropriate compression algorithm. In examples, where a database system from which a workload is captured includes more than one server or node, the capture file 305 can record data representative of activity occurring at a single node of the source database system.

Figure 4:
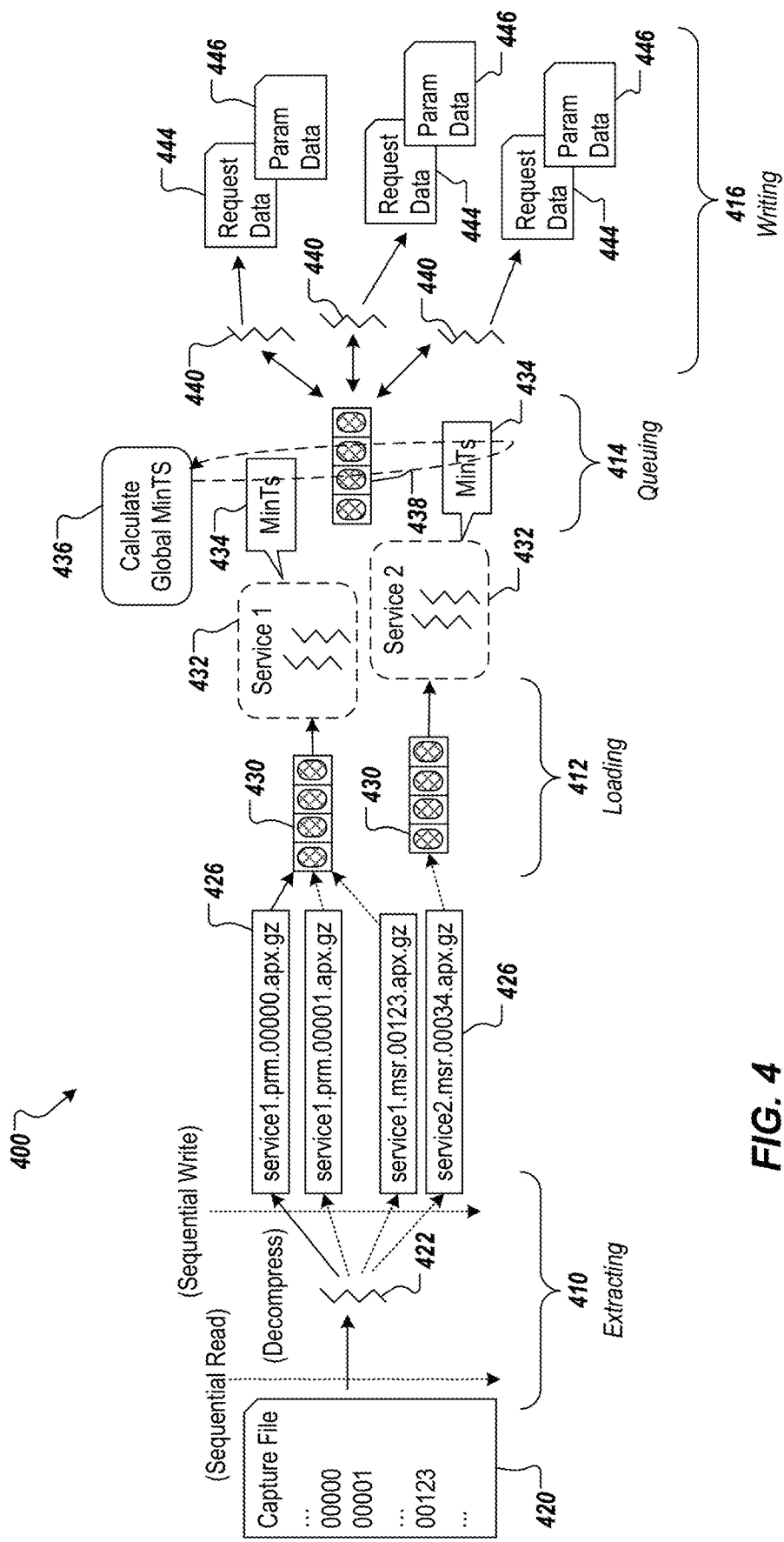
FIG. 4 depicts a process for converting a workload capture file into a replay file for execution in a target database system.

In some examples, the capture file 305 can include additional information. In the example of FIG. 4, the capture file 305 includes manifest information 355. Manifest information 355 can include, for example, information related to the source database system, such as a identifier for the program version used to implement the source database system and information relating to the computing system used to implement the source database system (e.g., the number and type of processors, amount and organization of memory and physical storage, information related to networked devices implementing the source database system, or configuration information for the source database system or its components). The manifest information 355 can also include a timestamp associated with the capture file 305 (e.g., a time the capture file was generated, a time the workload capture was initiated, a time workload capture was discontinued). When filters were used to select workload elements to capture, the filter information can also be included in the manifest information 355. When used to store information related to multiple database nodes, the fact table 310 and/or the dimension tables 315 can include information regarding which of the multiple database nodes was involved in executing operations of the workload capture unit, or a subcomponent thereof (such as in executing a statement associated with a particular session). In some examples, the manifest information 355 can be stored in a file, such as a compressed file, and included within the capture file 305.

In some examples, the capture file 305 can also include hash information 360. For example, query language statements in the fact table 310 or the dimension tables 315 can be represented by a hash. The hash information 360 can include a hash table correlating hash values to query language statements. By only storing the hash value of the query language statement in the measure file 310 or one or more of the context files 315, the amount of memory needed to store the workload capture can be reduced. In some examples, hash values can be used to confirm that execution of requests for database operations at the target database system produced the same results as when originally executed at the source database system. In some examples, the granularity of hashing can be specified, such as by a user, in such cases, the hash level can be included in the capture file 305, such as in the manifest information 355.

In some examples, the fact table 310 and the dimension or context tables 315 can be stored as files, and the fact or dimension files grouped together in the context file 305, optionally including a file for the manifest information 355 or a file for the hash information 360. In some examples, each of the context tables 315 is stored as a separate file within the capture file 305. Each of the capture files 305 can include a DIMID field, and one or more value fields. In a specific example, the values can be written in comma separated value format. Similarly, each measure can be stored as a separate file within the capture file 305. Each of the measure files can include a chronological identifier, such as a clock timestamp (such as for the overall database system from which the workload was captured). The chronological identifier can be used, for example, in staging replay of the capture units (such as sessions) represented in the capture file 305. The measure file can also include multiple DIMID fields to associate measures for a particular workload capture unit with its associated dimensions, and one or more numerical fields (such as performance or execution parameters or values). In particular examples, the DIMID or numerical fields can be written in comma separated value format.

In some examples, context files and one or more measure files can be stored for each of a plurality of services in a database system. The set of context files and one or more measure files for each of the services can be included in the capture file 305 (which, in at least some examples, represents a single database server or node, such as when the database system is distributed among multiple servers or nodes). For example, a database system can have separate services that include query language processing components and data stores, that produce information regarding the distribution of information (including database records) and database system components in the database system, that are responsible for handling certain types of client communications, such as web or http-based interactions, that manage various memory stores (such as transferring data between persistent storage and in-memory storage), and that monitor resource (such as CPU or memory) use in the database system (including across multiple database servers, when the database system is a distributed system).

As introduced above, for a workload to be replayed in a target database system, one or more capture files, representative of the workload, are pre-processed to provide one or more replay files. A replayer processes the replay files to replay the workload in the target database system. As described herein, the pre-processor processes the capture files to provide the replay files. More particularly, the pre-processor converts the capture file from the fact table and dimension tables schema (as described above with reference to FIG. 3) using joining requests from the fact table and dimension tables and globally sorting by operation sequence IDs within a session, where a dependency graph is aligned by the operation sequence ID.

FIG. 4 graphically depicts a process 400 for pre-processing to convert a workload capture file into a replay file for execution in a target database system. The process 400 includes an extraction sub-process 410, a loading sub-process 412, a queuing sub-process 414, and a writing sub-process 416.

In the extraction sub-process 410, a capture file 420 is read by one or more executor threads 422. In some examples, the executor thread(s) 422 read the capture file 420 sequentially. The executor thread(s) 422 can decompress a portion of the capture file 420 into files for various database services (e.g., a service providing query language processing, a service providing location information for data and database system components). The executor thread(s) 422 can write the content of the capture file 420 as one or more files 426, such as compressed files, associated with a service. Each service can include a plurality of files 426. For example, a particular service may be associated with one or more context files (dimension files) and one or more measure files (fact files).

In some examples, the files 426 can be placed in a queue 430 for in the loading sub-process 412. In the loading sub-process 412, each service may be associated with a loader thread group 432. Each loader thread group 432 can read appropriate files 426 from the queue 430 to determine which elements of the files 426 are associated with a particular capture unit (e.g., a session). In some examples, elements of files 426 from different loading processes (such as from different services) can be combined based on their capture unit. In some examples, the capture unit can be represented in an encoded format (e.g., as a hash value). In some examples, a particular request for database operations can include nested statements or operations. These statements or operations can, in some examples, be executed in parallel at multiple nodes of the database system. In such examples, the statements may be included in multiple workload capture files 420, but can be combined during processing of the capture file(s) 420 during conversion to replay data.

In some examples, as the files are loaded by the loader thread groups 432, context and measure information related to individual captures units (and their component operations) can be retrieved or collected by the loader thread groups 432 and added to a queue 438 in the queuing sub-process 414. In some examples, the queue 438 holds the information until the information is ready to be written to individual stores, such as files, for the session. For example, multiple stores may be generated for context information, organized in a format useable by a replay component (e.g., the replayer 224 of FIG. 2) to replay the workload at a second database system (e.g., the target database system 216).

In some examples, the queue 438 can be a table partitioned by session. Information in the queue 438 can be structured in a similar manner as context and measure information was associated with the session at the capture database system (e.g., the source database system 214 of FIG. 2). For example, the queue 438 can use the star schema of FIG. 3.

In some examples, the loader thread groups 432 can maintain information about the minimum timestamp (e.g., a system timestamp, commit timestamp, or other identifier) of information to be read by the loader thread groups 432 for their particular service. The loader thread groups 432 can update a global timestamp 436, which represents the minimum timestamp among all of the services being processed by the loader thread groups 432. The global timestamp 436 can be compared with a timestamp for the session (or other capture unit). When the global timestamp 436 is greater than or equal to the timestamp for a session, the session can be written to a store.

In some examples, as a session (or other capture unit) is completed, and writer threads 440 of the writing sub-process 416 are available, each session can be written (such as to a file or in memory) as a request data 444 and a parameter data 446. In some examples, the request data 444 and the parameter data 446 can be provided in one or more replay files. In some examples, the request data 444 can include context and measure information used to replay the session (including requests for database operations within the session). In some examples, the request data 444 can include performance data usable to compare execution of the requests with the execution of the requests at the workload capture database system. In some examples, the parameter data 446 can include parameters used in executing the requests, such as a statement string and parameter values used in executing query language operations.

In some examples, the writer threads 440 can combine context and measure data from the queue 438 as appropriate for the sessions, and requests for database operations thereof. Within a session, requests for database operations, and components thereof (such as statements, and operations associated with statements), can be ordered by the writer threads 440 during the writing process 416, such as chronologically (such as by using timestamps, for example, a system timestamp, a commit timestamp, or another identifier). In this manner, the requests will reproduce the workload of the first database system (e.g., the source database system 214 where the requests were captured) when the requests are carried out by a second database system (e.g., the target database system 216). For example, statements (or operations thereof) can be ordered within a session by a system clock timestamp or a global commit timestamp.

In some examples, when a session is written to a replay file (e.g., one or more replay files including the request data 444 and the parameter data 446), the data can be removed from the queue 438, which can limit the amount of memory or storage needed for the queue. In some examples, the queue 438 can be persisted, such as for use in comparing the performance of the database system where the workload is replayed to the performance of the workload capture database system.

In some examples, the request data 444 can include information to be replayed, the parameter data 446 can include performance measures associated with execution of the session (or other unit) at the first database system, to be compared with performance measures generated during execution of the workload at the second database system. In some examples, the request data 444 and the parameter data 446 can be replayed and used for comparison purposes multiple times. For example, the request data 444 can be replayed at the second database system using different performance or operational settings. The performance at the various settings of the second database system can be compared with one another, and with the parameter data 446.

FIG. 5A depicts an example structure of a capture file. FIG. 5B depicts an example structure of a replay file that is provided by a pre-processor processing the capture file of FIG. 5A.

Capture and replay systems, such as that described herein with reference to FIGS. 2-4, are described in further detail in commonly assigned U.S. Pat. No. 10,552,413, which is expressly incorporated herein by reference in the entirety for all purposes.

As introduced above, capture and replay systems can be used for problem detection and reproduction in database systems. For example, capture and replay can be used to replay a workload of a source database system to help resolve one or more issues (e.g., an issue in the source database system, an issue in a target database system). However, in some instances, it can be difficult to understand the specific cause of a problem. Consequently, it can be necessary to replay the entire workload to reproduce the problem again. In some cases, it can occur that the problem is observed in the middle of the workload, which makes it difficult to preserve the circumstances that resulted in the problem for further analysis, because workload continues to be replayed.

Accordingly, implementations of the present disclosure provide pause and resume (P&R) functionality in capture and replay of workloads in database systems. More particularly, implementations of the present disclosure enable the use of one or more tags to provide P&R functionality during replay of a workload. In this manner, result values of tagged requests are provided and displayed after the replayer executes the tagged requests during replay of the workload. Workload replay can then be resumed (e.g., in response to user input indicating resume). Accordingly, the P&R functionality creates a moment for an exclusive execution of a specific request to check its result and performance. Specifically, in response to a tag, all of the replaying activity pauses right before the request that is associated with the tag (the request of interest), so that the request can be executed alone.

In accordance with implementations of the present disclosure, P&R functionality is provided by tagging one or more requests with designated tag names. In some implementations, each tag identifies a breakpoint and is associated with a request ID. The tag is associated with multiple commands of the replayer. In some examples, the multiple commands include: pause, resume, and next. Next can include single execution of the paused request.

In some implementations, tagging of a request is only available after the capture file has been pre-processed to provide the replay file. The tags added to a request are used when grouping the performance values and result values after execution of the tagged request. More particularly, tagging a request produces an output file that includes metadata of the tags, and the output file is located in a preprocessed file directory. In some examples, tagging information is stored along with preprocess data. The replayer reads preprocess data to obtain what to replay, and there it also realizes what to hold. In addition, the tags in preprocess data is again associated with the replay result (statistics) by joining the preprocess data table (preprocess data loaded on a database table) and the replay result table.

In some implementations, a tag can be provided as a pause tag or an exclusive. In some examples, in response to a pause tag, the replayer stops all replaying activity at the tagged request. In some examples, in response to the exclusive tag, the replayer stops all replay threads first, and exclusively executes the tagged request, and resumes replay without manual input. In some examples, the exclusive tag enables performance measurement of a single query execution. The result provided by an exclusive tag is stored on the result table right after execution and is immediately available for review. There can be a separate call-out as the result is stored on a database table and the result table can be queried.

In some implementations, it is not possible to simultaneously tag a request as both pause and exclusive, because the respective actions are not compatible with each other. In some examples, when a database is queried by the replayer, a connection is made to the database and one or more queries are sent through the connection. The replayer makes a 'thread' per each connection as there can be multiple connections used simultaneously. In some examples, a replay thread is provided as a connection to a database that is to be queried.

In some implementations, a tag can be provided as one of multiple output types. For example, a result tag and a performance tag can be provided. In some examples, result values are provided for the request in response to a result tag. In some examples, performance values are provided in response to a performance tag. In some examples, a request can be tagged with one or both of a result tag and a performance tag.

In operation, each tag operates as a breakpoint, which is set to specify a request (tagged request) to pause right before its execution. Whenever the replayer reaches the commit ID of a request (on which a breakpoint is set) in a tag list, all threads of the replayer stop and the replayer changes its state to PAUSED. In this manner, a user observing the replay is able to investigate the state of the target database system before execution of the request. For example, the user can look at system views and/or a trace file before the request is executed. In response to a next command, the replayer executes the request. Immediately after the request is executed, the replayer falls into the PAUSED state again. For example, user input can be received to the replayer which indicates a NEXT command. In response to the NEXT command, the request is executed, the replayer is paused, and output is provided (e.g., result values and/or performance values are displayed). In this manner, the user observing the replay is able to investigate the state of the target database system after execution of the request. For example, the user can look at system views and/or a trace file after the request is executed.

In some examples, a RESUME command can be indicated (e.g., through user input to the). In response to the RESUME command, the replayer wakes up all the replay threads that are in the PAUSED state. In some implementations, replay can be canceled while the replayer is in the PAUSED state. In some examples, in response to cancelation while the replayer is in the PAUSED state, a state of the target database system is stored.

Figure 6:
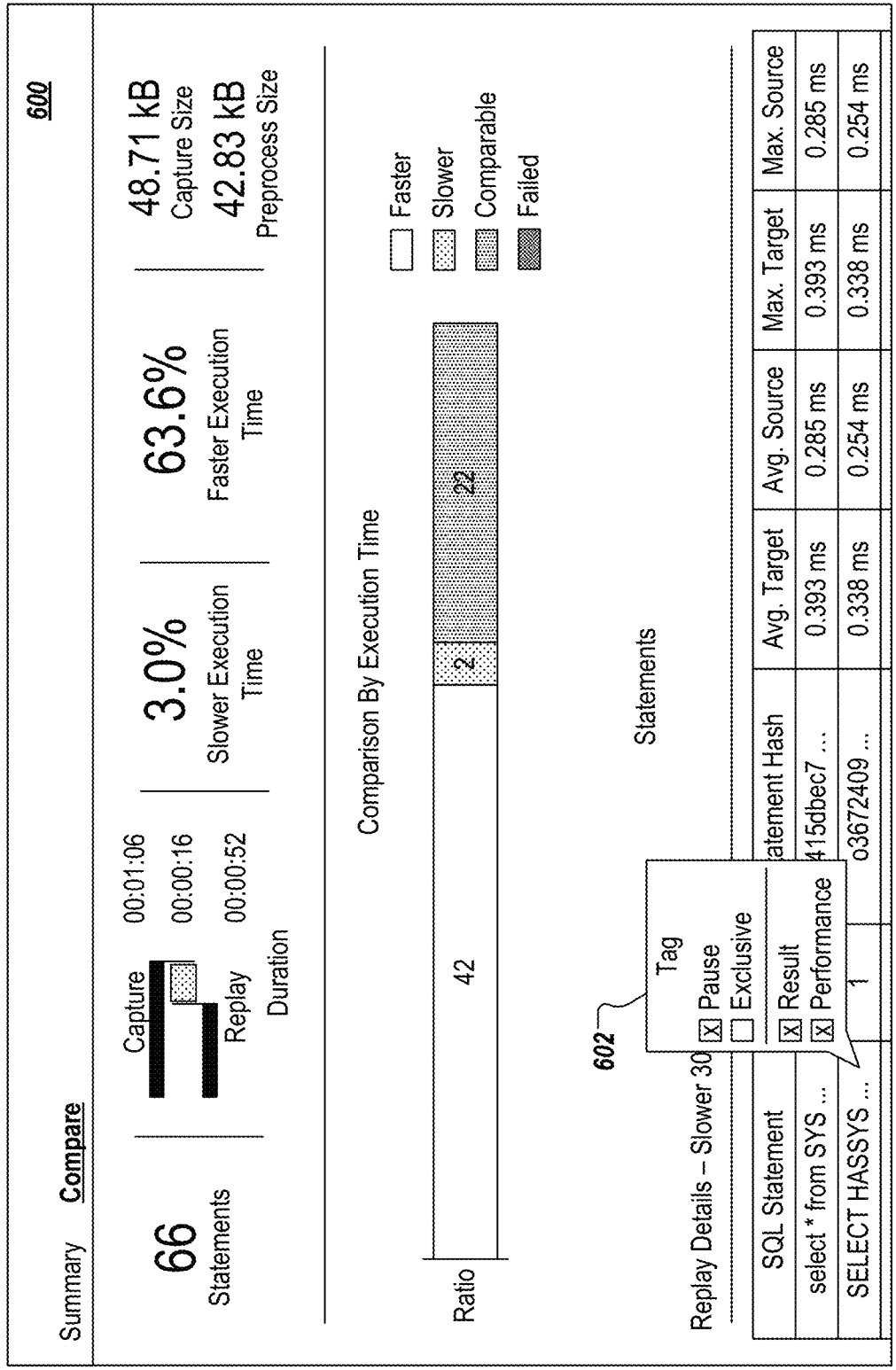
FIG. 6 depicts a screenshot of an example compare page that enables one or more requests to be tagged for replay in accordance with implementations of the present disclosure.

FIG. 6 depicts a screenshot of an example compare page 600 that enables one or more requests to be tagged for replay in accordance with implementations of the present disclosure. In the example of FIG. 6, the compare page 600 provides graphical representations of performance data and results data that are provided after replay of a workload in a target database system.

In some examples, performance data enables performance-based comparison provides an overview of statements compared by runtime. For example, and based on a selected tolerance ratio, the statements are classified as comparable when they have a similar runtime within the defined tolerance ratio, faster, slower, or failed. In some examples, results data enables result-based comparison, which provides an overview of statements with, for example, identical or different results. For example, a result-based replay report includes a classification of statement types based on the content of those statements being either deterministic or non-deterministic. Deterministic statements should always deliver the same results during a replay.

Non-deterministic statements are expected to deliver different results. In some examples, result data is used to classify pairs of statements (i.e., a statement executed in the source database system and a statement executed in the target database system) as identical, if their result sets have the same row count and the same result hash, different, if any of these criteria differ between capture and replay, skipped, if they are related to system calls, monitoring view accesses or other internal actions, which do not require a result-based check, and failed, if they returned an error code.

In some examples, the performance data and results data depicted in the compare page 600 can be reviewed by a user. If the user determines that one or more requests represented in the compare page 600 (or other appropriate page displayed by the capture and replay system) should be analyzed more closely (e.g., granular results should be provided), the user can tag the requests to enable P&R functionality for the requests in a subsequent replay of the workload. In some implementations, the user can select a request (e.g., left-click on a SQL statement), and in response, a tag interface 602 can be displayed. In the depicted example, the tag interface 602 enables the user to select whether the tag is for a pause or for an exclusive (e.g., the user is only able to select one or the other). In the depicted example, the tag interface 602 enables the user to select whether the tag is for results data and/or performance data. In the example of FIG. 6, the user has selected pause and both results and performance. As described herein, metadata is provided, which represents the tag as defined by the user. The metadata is associated with the respective request (e.g., in an output file), such that, when the request is to be executed in the target database system, the tag provides a breakpoint for the request.

In some implementations, the workload is again replayed within the target database system. For example, the target database system is re-initialized, such that it is in the state prior to an earlier replay of the workload in the target database system. That is, the target database system is put into the state that the source database system was in when the workload was originally captured in the source database system. The workload, with tag(s), is then replayed in the target database system, during which P&R functionality is provided, as described herein.

Figure 7:
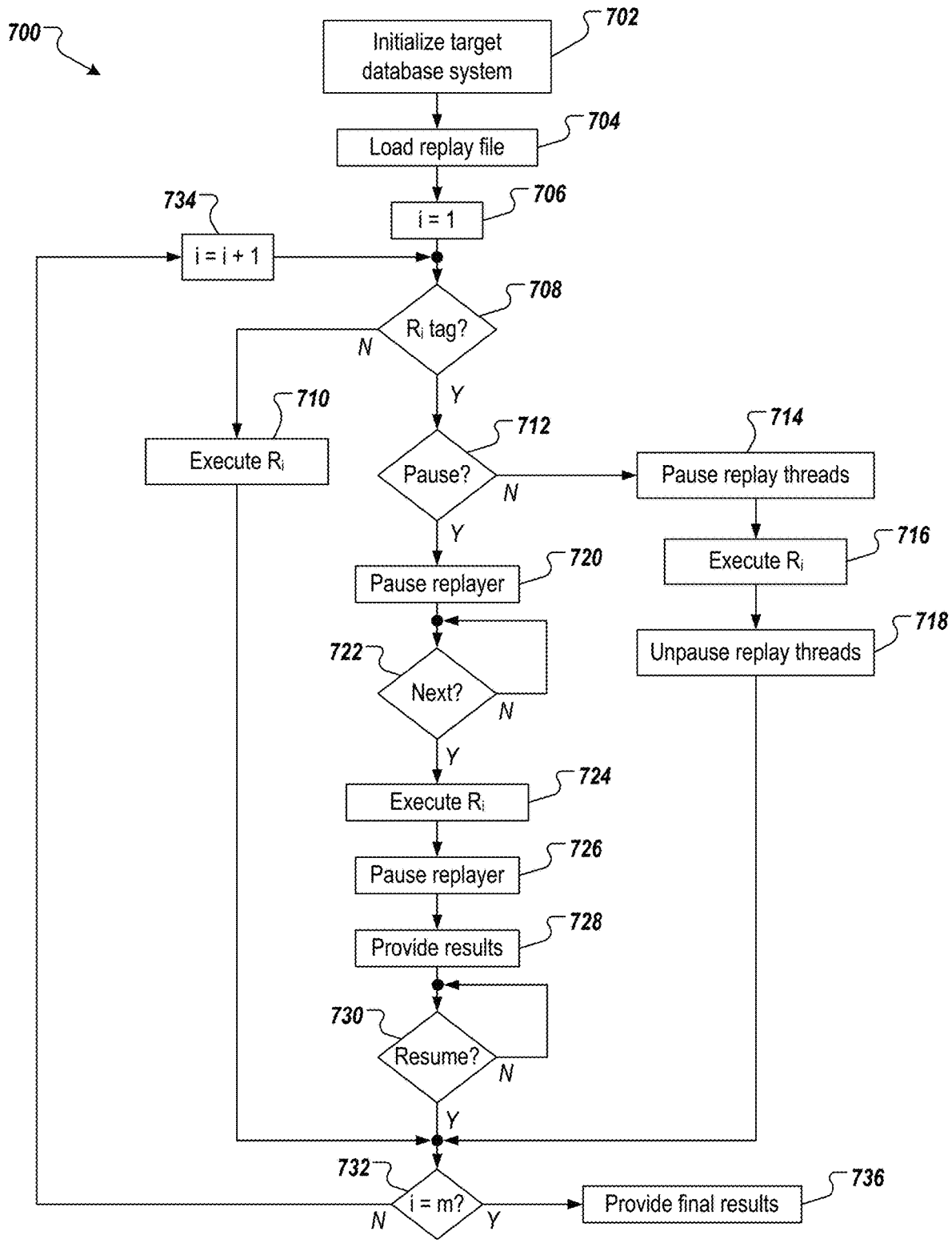
FIG. 7 depicts an example process that can be executed in accordance with implementations of the present disclosure.

FIG. 7 depicts an example process 700 that can be executed in accordance with implementations of the present disclosure. In some examples, the example process 700 is provided using one or more computer-executable programs executed by one or more computing devices.

The target database system is initialized (702). For example, the target database system, on which a workload is to be replayed, is initialized to the state that a source database system was in, when the workload was captured from the source database system. One or more replay files are loaded (704). For example, and as described herein, a capture file is pre-processed to provide a replay file, and one or more tags are associated with the replay file. The replay file includes a set of requests ($R_1, \ldots R_m$) that include query statements (e.g., SQL statements) for manipulating the target database system.

The replayer that is to replay the workload in the target database system is started. In some examples, the replayer is started using the following command on a Linux command line of the target database system that the replayer is to be started on:

hdbwlreplayer-controlhost<controlHost>(-
controlport<controlPort>|-
controlinstnum<controlInstanceNumber>[-
controldbname<controlDatabaseName>])-
controladminkey<userName,secureStoreKey>-
port<listenPortNumber> where controlhost specifies the database host name of the control or target system, controlinstnum specifies the database instance number, controladminkey specifies the user name and secure store key of the control management connection, controldbname specifies the database name, port specifies the discretional port number for internal communication, and controlport specifies the control instance.

A counter i is set equal to 1 (706). It is determined whether a request i ($R_i$) is tagged (708). For example, it can be determined whether the request $R_i$ is associated with metadata defining a tag for the request $R_i$. If the request $R_i$ is not tagged, the request $R_i$ is executed (710). For example, the replayer executes the query statement on the target database system. If the request $R_i$ is tagged, it is determined whether the tag is a pause tag (712). For example, the metadata is read to determine whether the tag is defined as a pause tag. If the tag is not a pause tag, it is determined that the tag is an exclusive tag. In response, the replay threads of the replayer are paused (714), the request $R_i$ is executed (716), and the replay threads are unpaused (718). The replayer then continues to replay the workload as described herein.

If the tag is a pause tag, the replayer pauses (720). That is, the replayer pauses before execution of the request $R_i$. It is determined whether a NEXT command has been initiated (722). For example, it is determined whether user input has been received, which indicates the NEXT command. If the NEXT command has not been initiated, the example process 700 loops back. If the NEXT command has been initiated, the request $R_i$ is executed (724), the replayer pauses (726), and results are provided (728). For example, and as described herein, results of execution of the request $R_i$ are displayed. It is determined whether a RESUME command has been initiated (730). For example, it is determined whether user input has been received, which indicates the RESUME command. If the RESUME command has not been initiated, the example process 700 loops back.

If the RESUME command has been initiated, it is determined whether i is equal to m (732). That is, it is determined whether all of the requests in the workload have been executed. If i is not equal to m, i is incremented (734) and the example process 700 loops back to consider the next request in the workload. If i is not equal to m, replay of the workload within the target database system ends and final results are provided (736). For example, result data and performance data can be displayed in a compare page (or summary page), as described above with reference to FIG. 6.

Figure 8:
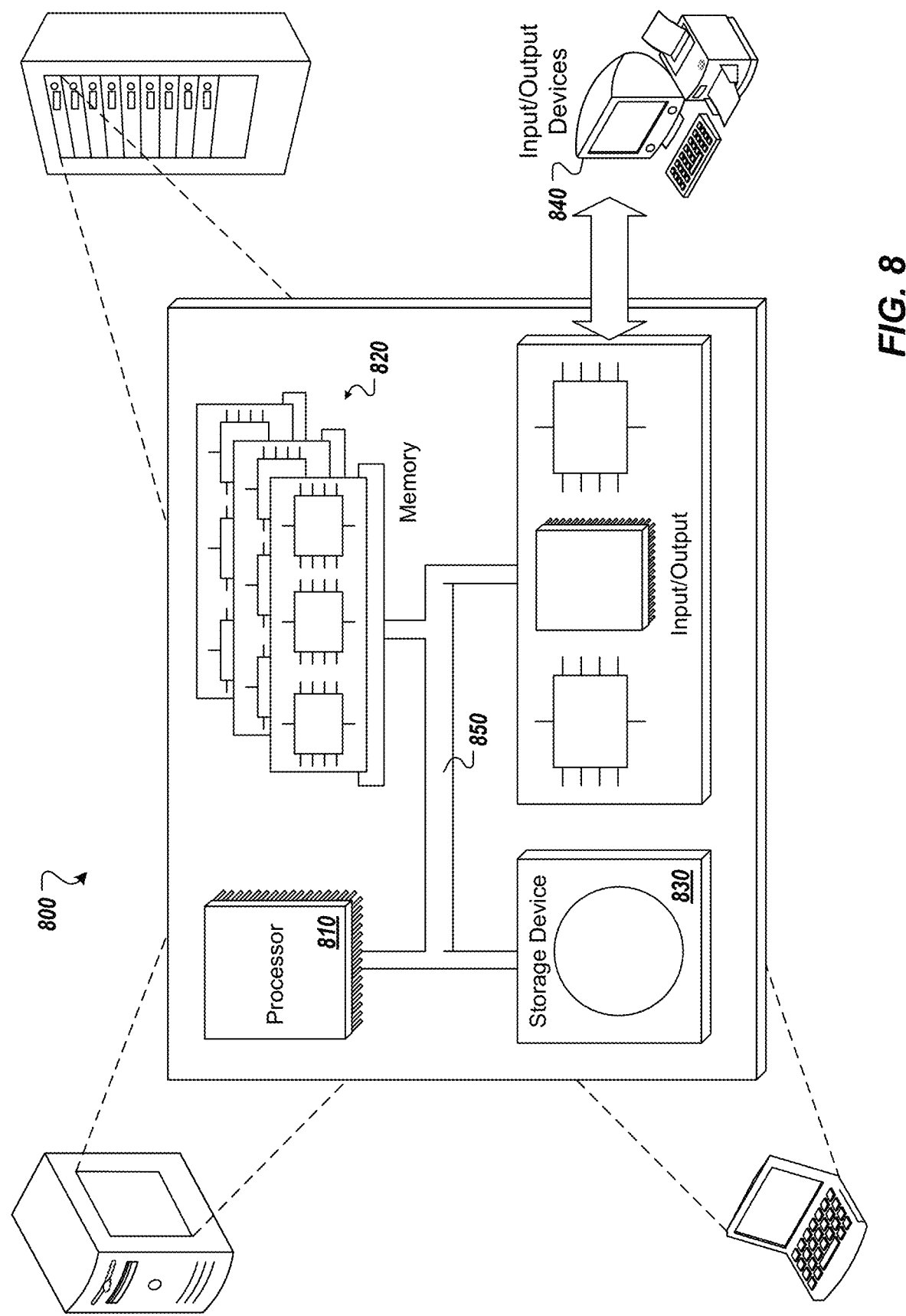
FIG. 8 is a schematic illustration of example computer systems that can be used to execute implementations of the present disclosure.

Referring now to FIG. 8, a schematic diagram of an example computing system 800 is provided. The system 800 can be used for the operations described in association with the implementations described herein. For example, the system 800 may be included in any or all of the server components discussed herein. The system 800 includes a processor 810, a memory 820, a storage device 830, and an input/output device 840. The components 810, 820, 830, 840 are interconnected using a system bus 850. The processor 810 is capable of processing instructions for execution within the system 800. In some implementations, the processor 810 is a single-threaded processor. In some implementations, the processor 810 is a multi-threaded processor. The processor 810 is capable of processing instructions stored in the memory 820 or on the storage device 830 to display graphical information for a user interface on the input/output device 840.

The memory 820 stores information within the system 800. In some implementations, the memory 820 is a computer-readable medium. In some implementations, the memory 820 is a volatile memory unit. In some implementations, the memory 820 is a non-volatile memory unit. The storage device 830 is capable of providing mass storage for the system 800. In some implementations, the storage device 830 is a computer-readable medium. In some implementations, the storage device 830 may be a floppy disk device, a hard disk device, an optical disk device, or a tape device. The input/output device 840 provides input/output operations for the system 800. In some implementations, the input/output device 840 includes a keyboard and/or pointing device. In some implementations, the input/output device 840 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier (e.g., in a machine-readable storage device, for execution by a programmable processor), and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, for example, a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for pause and resume during replay of a workload in a target database system, the method being executed by one or more processors and comprising:

receiving a capture file, the capture file comprising data representative of a workload executed in a source database system;

processing the capture file to provide a replay file, the replay file being in a format that is executable by a replayer to replay the workload in a target database system, the workload comprising a set of requests represented within the replay file;

providing a set of tags associated with the replay file, the set of tags comprising one or more tags, each tag being provided after processing of the capture file to provide the replay file, each tag being associated with a request in the set of requests by a request identifier of the request, and each tag being associated with multiple commands of the replayer;

for the request, providing an output file in response to a tag being added to the request, the output file storing metadata of the tag, such that the tag provides a breakpoint for the request when the request is executed in the target database system; and during replay of the workload in the target database system:
pausing replay of the workload in response to the tag,
executing a request associated with the tag,
providing replay results specific to the request, and
selectively resuming replay of the workload in the target database system; and
wherein the tag comprises one of a pause tag and an exclusive tag, and, if the tag comprises a pause tag all replay activity of the workload is paused and the resuming replay of the workload is performed in response to user input, and if the tag comprises an exclusive tag all replay threads are paused first, then the request is exclusively executed, and the resuming replay of the workload is atomically preformed without user input.

2. The method of claim 1, wherein the tag comprises a pause tag and resuming replay of the workload is performed in response to user input.

3. The method of claim 1, wherein the tag comprises an exclusive tag and resuming replay of the workload is automatically performed absent user input.

4. The method of claim 1, wherein the replay results comprise one or more of results data and performance data as indicated in the tag.

5. The method of claim 1, wherein executing the request associated with the tag is performed in response to user input.

6. The method of claim 1, wherein, prior to replay of the workload, the target database system is initialized to a state of the source database system when the workload was captured at the source database system.

7. The method of claim 1, wherein the request comprises at least one query statement that is executed in the target database system to manipulate data within the target database system.

8. A non-transitory computer-readable storage medium coupled to one or more processors and having instructions stored thereon which, when executed by the one or more processors, cause the one or more processors to perform operations for pause and resume during replay of a workload in a target database system, the operations comprising:
   receiving a capture file, the capture file comprising data representative of a workload executed in a source database system;
   processing the capture file to provide a replay file, the replay file being in a format that is executable by a replayer to replay the workload in a target database system, the workload comprising a set of requests represented within the replay file;
   providing a set of tags associated with the replay file, the set of tags comprising one or more tags, each tag being provided after processing of the capture file to provide the replay file, each tag being associated with a request in the set of requests by a request identifier of the request, and each tag being associated with multiple commands of the replayer;
   for the request, providing an output file in response to a tag being added to the request, the output file storing metadata of the tag, such that the tag provides a breakpoint for the request when the request is executed in the target database system; and
   during replay of the workload in the target database system:
   pausing replay of the workload in response to the tag,
   executing a request associated with the tag,
   providing replay results specific to the request, and
   selectively resuming replay of the workload in the target database system; and
   wherein the tag comprises one of a pause tag and an exclusive tag, and, if the tag comprises a pause tag all replay activity of the workload is paused and the resuming replay of the workload is performed in response to user input, and if the tag comprises an exclusive tag all replay threads are paused first, then the request is exclusively executed, and the resuming replay of the workload is atomically preformed without user input.

9. The computer-readable storage medium of claim 8, wherein the tag comprises a pause tag and resuming replay of the workload is performed in response to user input.

10. The computer-readable storage medium of claim 8, wherein the tag comprises an exclusive tag and resuming replay of the workload is automatically performed absent user input.

11. The computer-readable storage medium of claim 8, wherein the replay results comprise one or more of results data and performance data as indicated in the tag.

12. The computer-readable storage medium of claim 8, wherein executing the request associated with the tag is performed in response to user input.

13. The computer-readable storage medium of claim 8, wherein, prior to replay of the workload, the target database system is initialized to a state of the source database system when the workload was captured at the source database system.

14. The computer-readable storage medium of claim 8, wherein the request comprises at least one query statement that is executed in the target database system to manipulate data within the target database system.

15. A system, comprising:
   a computing device; and
   a computer-readable storage device coupled to the computing device and having instructions stored thereon which, when executed by the computing device, cause the computing device to perform operations for natural language explanations for pause and resume during replay of a workload in a target database system, the operations comprising:
   receiving a capture file, the capture file comprising data representative of a workload executed in a source database system;
   processing the capture file to provide a replay file, the replay file being in a format that is executable by a replayer to replay the workload in a target database system, the workload comprising a set of requests represented within the replay file;
   providing a set of tags associated with the replay file, the set of tags comprising one or more tags, each tag being provided after processing of the capture file to provide the replay file, each tag being associated with a request in the set of requests by a request identifier of the request, and each tag being associated with multiple commands of the replayer;
   for the request, providing an output file in response to a tag being added to the request, the output file storing metadata of the tag, such that the tag provides a breakpoint for the request when the request is executed in the target database system; and
   during replay of the workload in the target database system:
   pausing replay of the workload in response to the tag,
   executing a request associated with the tag,
   providing replay results specific to the request, and
   selectively resuming replay of the workload in the target database system; and
   wherein the tag comprises one of a pause tag and an exclusive tag, and, if the tag comprises a pause tag all replay activity of the workload is paused and the resuming replay of the workload is performed in response to user input, and if the tag comprises an exclusive tag all replay threads are paused first, then the request is exclusively executed, and the resuming replay of the workload is atomically preformed without user input.

16. The system of claim 15, wherein the tag comprises a pause tag and resuming replay of the workload is performed in response to user input.

17. The system of claim 15, wherein the tag comprises an exclusive tag and resuming replay of the workload is automatically performed absent user input.

18. The system of claim 15, wherein the replay results comprise one or more of results data and performance data as indicated in the tag.

19. The system of claim 15, wherein executing the request associated with the tag is performed in response to user input.

20. The system of claim 15, wherein, prior to replay of the workload, the target database system is initialized to a state of the source database system when the workload was captured at the source database system.

* * * * *